(12) United States Patent
Skalecki et al.

(10) Patent No.: US 6,195,354 B1
(45) Date of Patent: Feb. 27, 2001

(54) ROUTE SELECTION FOR PATH BALANCING IN CONNECTION-ORIENTED PACKET SWITCHING NETWORKS

(75) Inventors: Darek Robert Skalecki; Donald W. Fedyk, both of Nepean; Peter J. Ashwood-Smith, Hull; Yair Matas, Ottawa, all of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 08/895,589

(22) Filed: Jul. 16, 1997

(51) Int. Cl.[7] .................................................. H04L 12/28
(52) U.S. Cl. ........................... 370/395; 370/237; 370/232
(58) Field of Search .................................. 370/394, 395, 370/396, 397, 400, 237, 468, 218, 216, 232

(56) References Cited

U.S. PATENT DOCUMENTS

| | | | |
|---|---|---|---|
| 4,679,189 | * | 7/1987 | Olson .................................... 370/396 |
| 4,870,641 | * | 9/1989 | Pattavina ............................... 370/397 |
| 5,265,091 | * | 11/1993 | Van Landegem ..................... 370/468 |
| 5,347,511 | * | 9/1994 | Gun ....................................... 370/400 |
| 5,398,236 | * | 3/1995 | Hemmady ............................. 370/395 |
| 5,404,451 | * | 4/1995 | Nemirovsky .......................... 370/400 |
| 5,629,930 | * | 5/1997 | Beshai ................................... 370/396 |
| 5,687,168 | * | 11/1997 | Iwata ..................................... 370/255 |
| 5,850,385 | * | 12/1998 | Esaki ..................................... 370/216 |

* cited by examiner

Primary Examiner—Douglas W. Olms
Assistant Examiner—Ricardo M. Pizarro
(74) Attorney, Agent, or Firm—Finnegan, Henderson, Farabow, Garrett & Dunner, L.L.P.

(57) ABSTRACT

In a methodology for route selection for path balancing in a connection-oriented packet switching network, a comparison is made of the measures of utilizations of a network resource by at least two links of a link group in the network, and at least one link is identified as a candidate for carrying traffic path based on the comparison. Network traffic path on the link is then moved to the candidate link to reduce variation in the utilization of the network resource by each of the links.

39 Claims, 6 Drawing Sheets

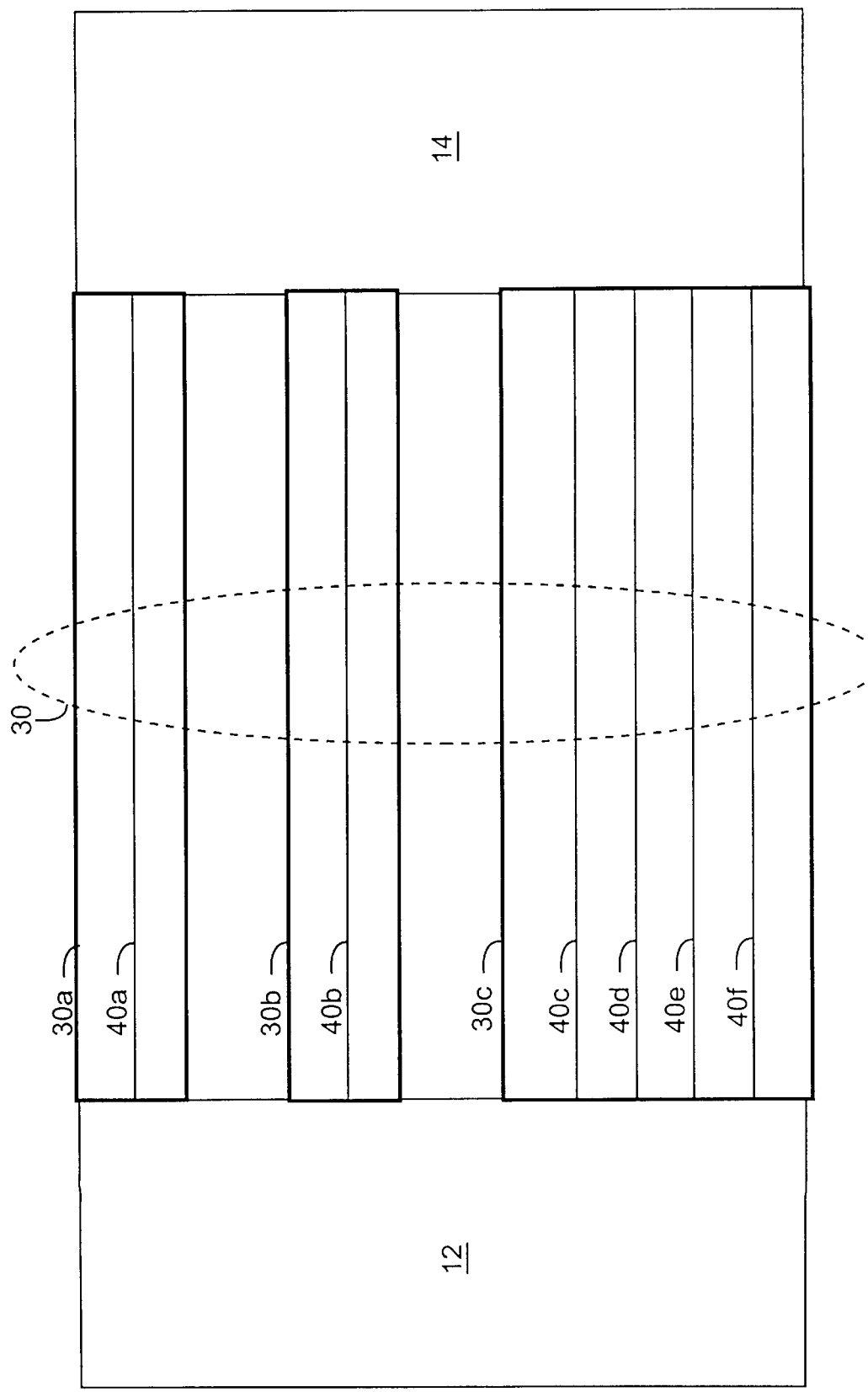

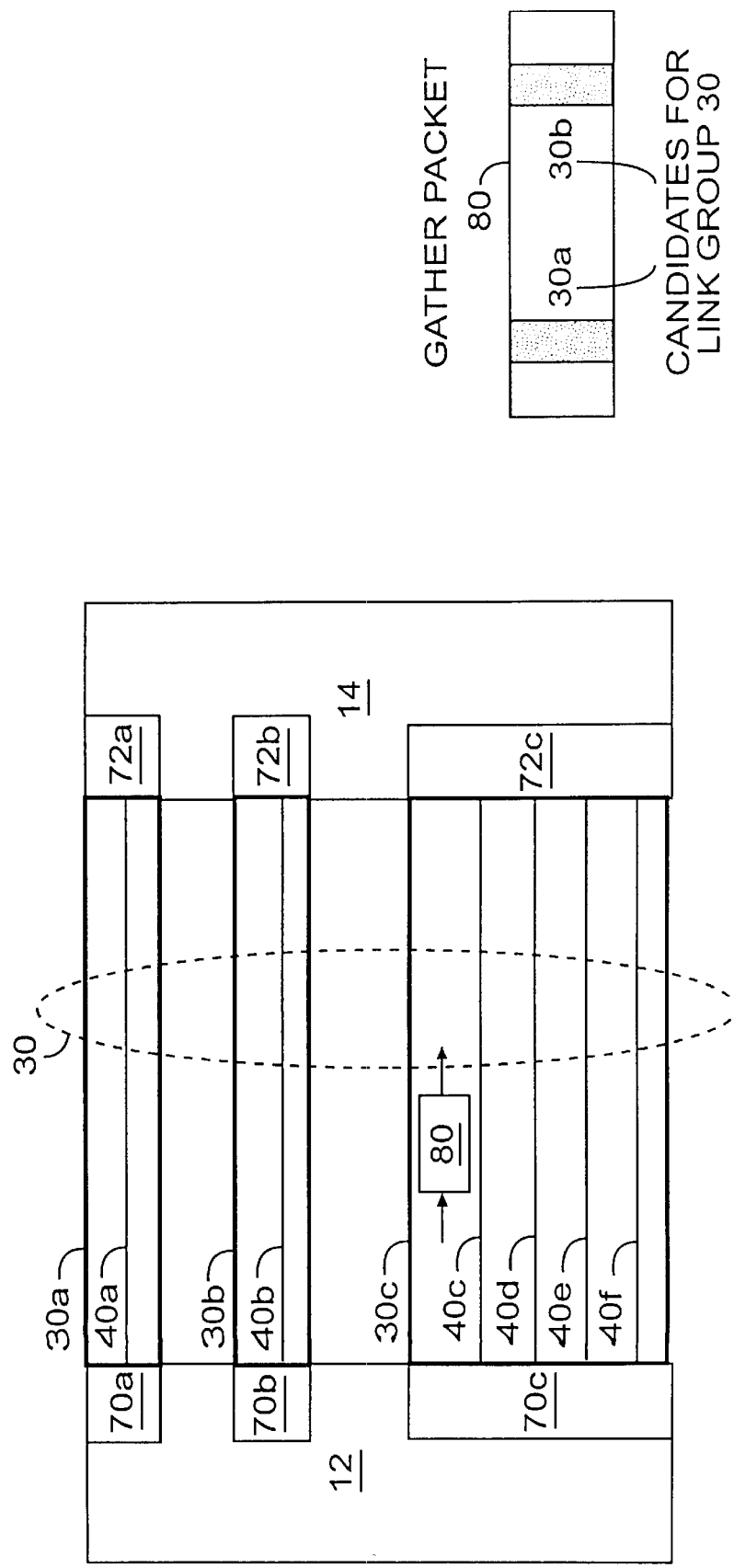

ROUTE SELECTION FOR PATH BALANCING IN CONNECTION-ORIENTED PACKET SWITCHING NETWORKS

BACKGROUND OF THE INVENTION

The present invention relates to packet switching networks and, more particularly, to route selection and path balancing in connection-oriented packet switching networks.

In a connection-oriented packet switching network, an example of which includes an X.25 packet network (as well as an Asynchronous Transfer Mode (ATM) network, which can operate in a connection-oriented environment), virtual circuits or connections are established before traffic can be sent on them. A connection-oriented packet switching network consists of switching nodes interconnected by transmission link groups, each of which comprises any number of parallel transmission links. When the network establishes a connection, the network selects a route that may go through a number of intermediate switching nodes. The route consists of active traffic paths established on the transmission link groups connecting the switching nodes along the route. Each traffic path is established on one transmission link between a pair of nodes.

Within each transmission link group, the network traffic among transmission links should be balanced to enhance congestion management capability, fault recovery, and quality of service to name a few. Decisions as to how to balance paths within a transmission link group may be made during route selection by a single node such as the source node. One disadvantage with this approach is that the view any single switching node has of the entire network is likely outdated. As a result of network delay, the node may be unaware of the establishment of new connections and the termination of old connections since the last update of the switching node.

A better alternative is to make path balancing decisions at transmission links as paths are being established on each transmission link group. Although basing balancing decisions as paths are being established uses up-to-date information about other active paths on the transmission link group, terminating connections or adding new transmission links to transmission link groups may cause an imbalance if path balancing decisions are made only when new paths are established.

Traffic may also become unbalanced when a transmission link fails. When a link fails, traffic from the failed link may be rerouted to other links in the transmission link group. Unless traffic is rerouted to that link upon its restoration to service, traffic may not be balanced among the links in the transmission link group.

It is, therefore, desirable to redistribute established, active traffic paths in transmission link groups in a connection-oriented packet switching network to balance the traffic paths among the transmission links in the transmission link groups. It is even more desirable to redistribute established, active paths in a transmission link group to reduce variance in utilization of path resources, such as bandwidth, CPU, and/or memory between links of a group. It is also desirable to redistribute established, active paths in a transmission link group to reduce variance in average utilization of path resources between links of a group on a per link basis.

SUMMARY OF THE INVENTION

This invention meets those needs through a method for redistributing network traffic paths based on comparisons of network resource utilization.

Additional desires and goals will be set forth in part in the following description, and in part will be appreciated by one of ordinary skill in the art from the description, or may be learned by practice of the invention. The desires and goals of the invention will be realized and attained by the elements and combinations in the appended claims.

To achieve the objectives and in accordance with the purpose of the invention, as embodied and broadly described herein, a method consistent with the present invention is provided for distributing traffic paths among a plurality of links in a connection-oriented packet switching network. The network includes a plurality of switching nodes interconnected by a plurality of link groups, each including a plurality of links for carrying traffic paths. The method comprises the steps of comparing a measure of the utilization of a network resource by a first one of the links of a group currently carrying a traffic path with a measure of the utilization of the network resource by a second one of the links of the group; and identifying one of the first or second links as a candidate for carrying the traffic path based on the comparison. Consistent with the present invention, the step of identifying includes the substep of identifying all candidate links for carrying the traffic path, the method further comprising the step of moving the traffic path to a candidate link such that the move reduces variation in the utilization of the network resource by each of the links in the group.

The above desires, other desires, features, and advantages of the present invention will be readily appreciated by one of ordinary skill in the art from the following detailed description of the preferred implementations when taken in connection with the accompanying drawings.

BRIEF DESCRIPTION OF THE DRAWINGS

FIG. 2 is a detailed view of a transmission link group and transmission links between two switching nodes of the network of FIG. 1;

FIG. 5 shows a gather packet consistent with an implementation of the present invention.

DESCRIPTION OF THE PREFERRED IMPLEMENTATIONS

Figure 1:
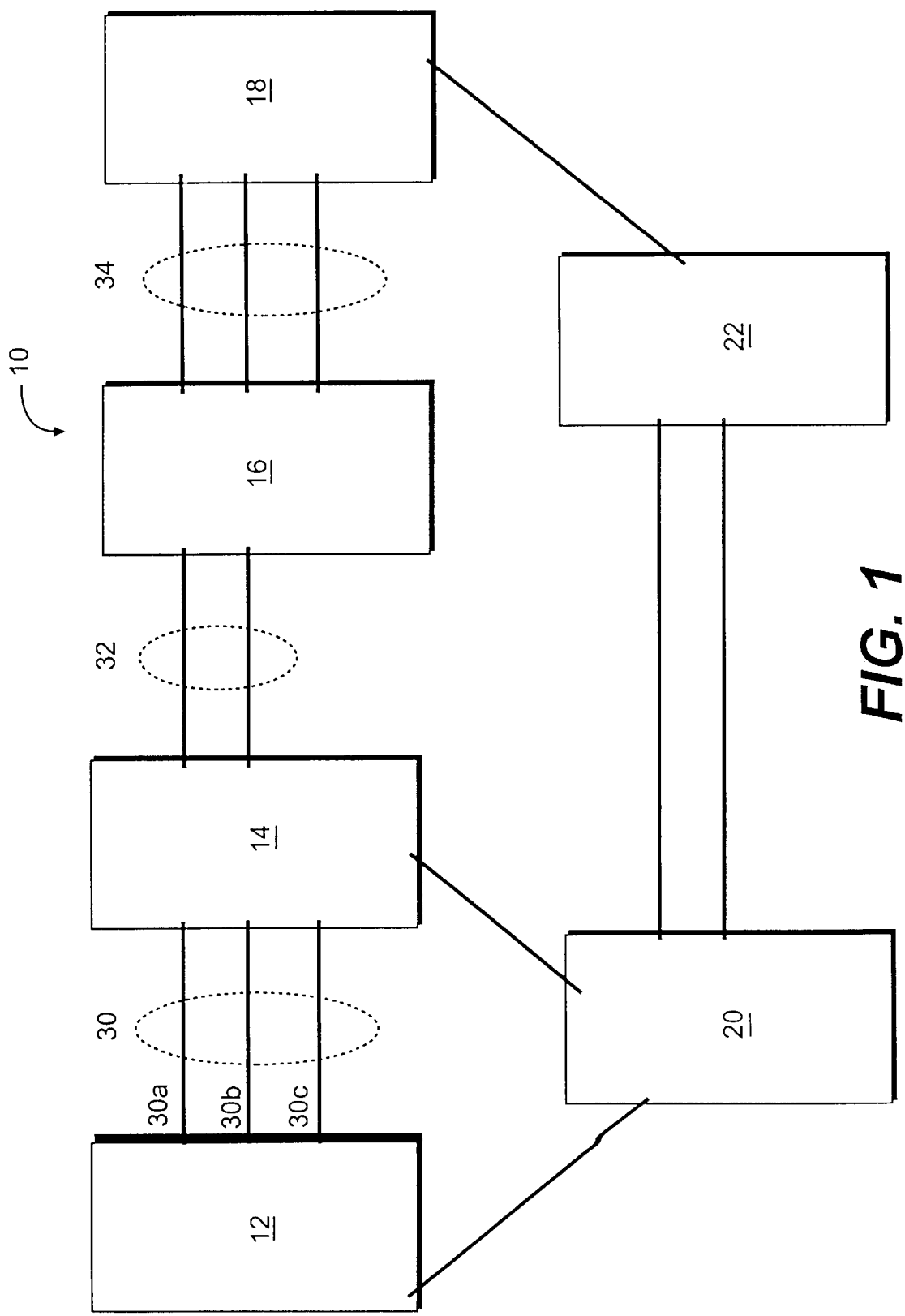
FIG. 1 is a high level diagram of a connection-oriented packet switching network within which a route selection for path balancing scheme consistent with the present invention may be implemented.

FIG. 1 depicts a high level diagram of a portion of a connection-oriented packet switching network 10 within which route selection for path balancing consistent with the present invention may function. Switching nodes 12–22 are interconnected by a plurality of transmission link groups (or trunk groups), three of which—groups 30, 32, and 34—are shown for purposes of this discussion. An example of such a switching node is an X.25 packet switch or an ATM switch operating in a connection-oriented environment. Each transmission link group 30, 32, and 34 includes one or more transmission links (or trunks).

Virtual circuits or connections in network 10 are established before traffic can be sent. Network 10 establishes a route for a connection between switching nodes, such as source switching node 12 and destination switching node 18. The route may be established directly between switching node 12 and switching node 18, or through intermediate switching nodes, such as switching nodes 14 and 16 in FIG. 1. The route will be established on transmission link groups interconnecting the switching nodes along the route. For example, in FIG. 1, a route between switching node 12 and switching node 18 is established on transmission link groups 30, 32, and 34. Within each transmission link group, a route will be established on only one transmission link. A number of routes may be established on each transmission link (e.g., links 3a,b,c) within a transmission link group (e.g., group 30) resulting in a number of traffic paths.

FIG. 2 depicts transmission link group 30 and switching nodes 12 and 14 in greater detail. Transmission link group 30 includes a plurality of transmission links 30a–c, each of which includes at least one active path. As shown in FIG. 2, for example, link 30a includes active path 40a, link 30b includes active path 40b, and link 30c includes active paths 40c,d,e,f. As part of route establishment between switching nodes 12 and 14, an active path corresponding to that segment of the route is established on one of transmission links within transmission link group 30.

Systems and methods consistent with the present invention redistribute active paths 40a–40f associated with transmission links 30a–c of transmission link group 30 to distribute resources, such as bandwidth, CPU, memory, etc., more equally among the transmission links within the transmission link group. In one preferred implementation consistent with the invention, redistribution of active paths 40a–f among transmission links 30a–c results in relatively equal bandwidth utilization among the transmission links.

Figure 3B:
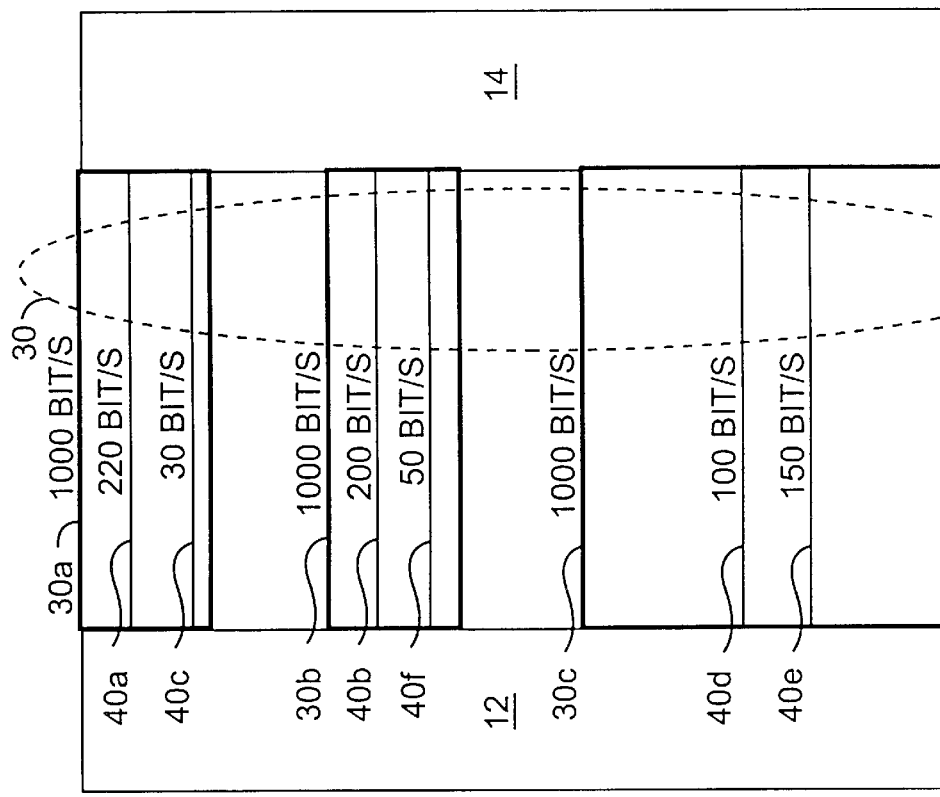
FIGS. 3A and 3B illustrate a path balancing operation consistent with the present invention on a transmission link group between two switching nodes.
Figure 3A:
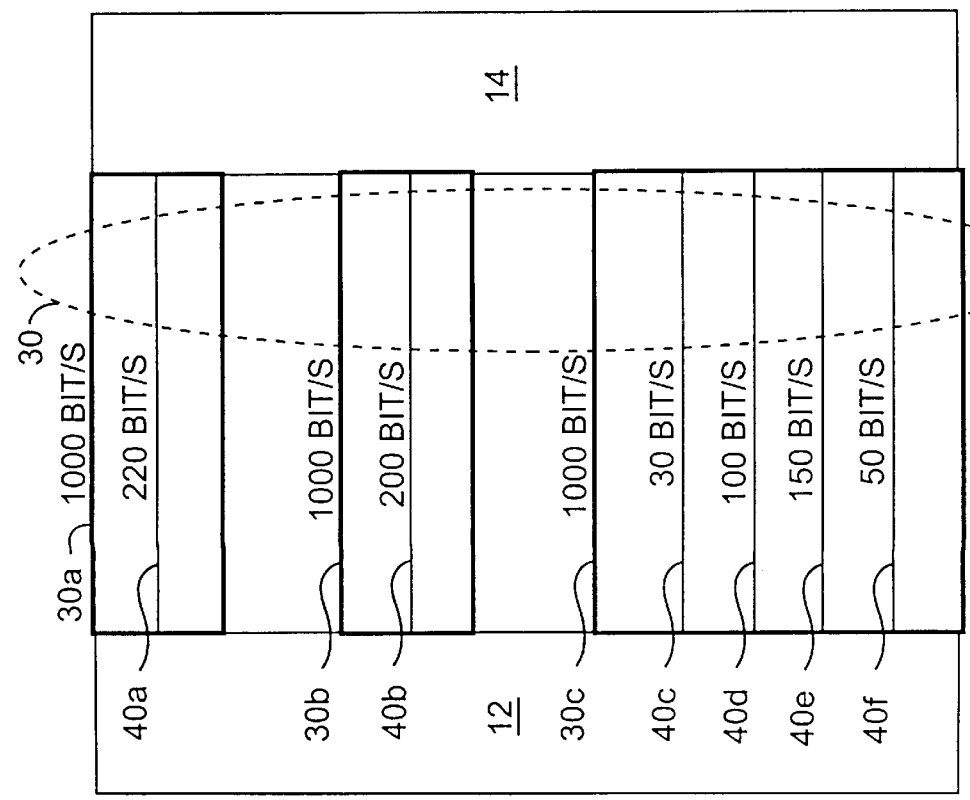

FIG. 3A shows the distribution of active paths 40a–f before a redistribution of the paths consistent with the present invention. By way of example only, each of the transmission links has a total bandwidth capacity of 1000 bits/second. Transmission link 30a carries active path 40a, which utilizes 220 bits/second of bandwidth, and transmission link 30b carries active path 40b, which utilizes 200 bits/second. Transmission link 30c carries active paths 40c–f, which together utilize 300 bits/second. Bandwidth utilization—calculated as the total bandwidth of all active paths on a transmission link divided by the total bandwidth capacity of that transmission link—of links 30a–c therefore stands at 22%, 20%, and 30%, respectively.

FIG. 3B shows the distribution of active paths 40a–f after a redistribution operation consistent with the present invention. Active path 40c has been moved from transmission link 30c to transmission link 30a, and active path 40f has been moved from transmission link 30c to transmission link 30b. After this redistribution, each link has a bandwidth utilization of 25%.

Consistent with the present invention, a switching node decides whether to move an active path from one transmission link to another in the same transmission link group so that network resources will be more balanced for that transmission link group. Switching node 12 in FIG. 2, for example, decides whether to move active path 40c from transmission link 30c to a different transmission link within group 30. In one implementation, candidate transmission links are identified based on a comparison of the current and projected bandwidths on the links affected by the transfer. One such equation for effecting the comparison is:

$$|UC_Z - UC_K| > |UP_Z - UP_K|, \qquad (1)$$

where $UC_Z$ is the current bandwidth utilization of transmission link 30c presently carrying active path 40c, $UC_K$ is the current bandwidth utilization of candidate transmission link, 30a or 30b, $UP_Z$ is the projected bandwidth utilization of transmission link 30c presently carrying active path 40c, and $UP_K$ is the projected bandwidth utilization of candidate transmission link 30a or 30b. Projected bandwidth utilization $UP_Z$ represents the bandwidth utilization of transmission link 30c after active path 40c is moved from it, and projected bandwidth utilization $UP_K$ represents the bandwidth utilization of candidate transmission link 30a or 30b after active path 40c is moved to it.

Furthermore, all transmission links that satisfy both of the following equations are also identified as candidates for redistribution:

$$|UC_Z - UC_K| = |UP_Z - UP_K| \qquad (2)$$

$$|AC_Z - AC_K| > |AP_Z - AP_K| \qquad (3)$$

where $AC_Z$ is the current average bandwidth of transmission link $30_c$ presently carrying active path 40c, $AC_K$ is the current average bandwidth of candidate transmission link 30a or 30b, $AP_Z$ is the projected average bandwidth of transmission link 30c presently carrying active path 40c, and $AP_K$ is the projected average bandwidth of candidate transmission link 30a or 30b. Average bandwidth, or average bandwidth per active path, is the total bandwidth of all active paths on a transmission link divided by the number of active paths. Projected average bandwidth $AP_Z$ is the average bandwidth of transmission link 30c if the active path is moved from it, and projected average bandwidth $AP_K$ is the projected average bandwidth of candidate transmission link 30a or 30b if the active path is moved to it.

Consistent with the present invention, when a link group includes more than two links, each link is considered for candidate status. Thus, comparisons between link pairs do not end once a candidate link is identified. All other links in the group are checked for candidate status. In the case where multiple links have been identified as candidates, the best candidate transmission link is selected as the preferred link to which the active path should be moved. According to one method consistent with the present invention, the candidate transmission link with the lowest projected bandwidth utilization, $UP_K$, is selected as the preferred candidate transmission link.

Figure 4A:
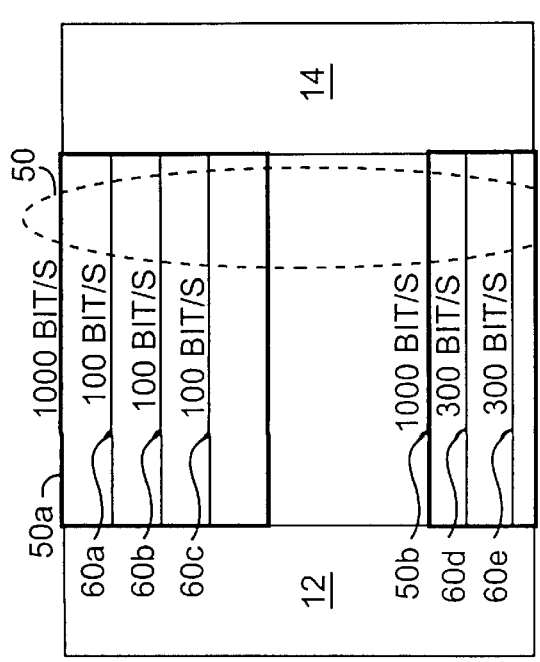
FIGS. 4A–C illustrate results of another path balancing operation consistent with the present invention on a transmission link group between two switching nodes.
Figure 4B:
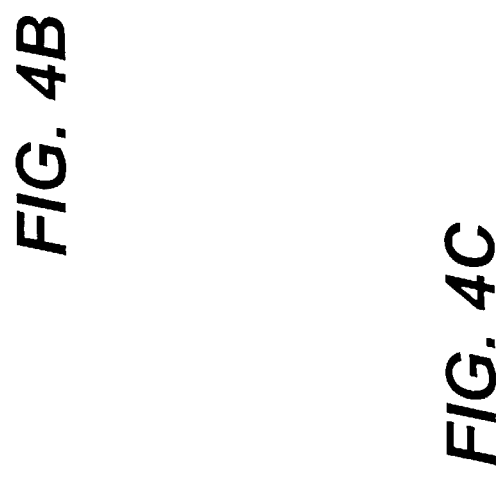
Figure 4C:
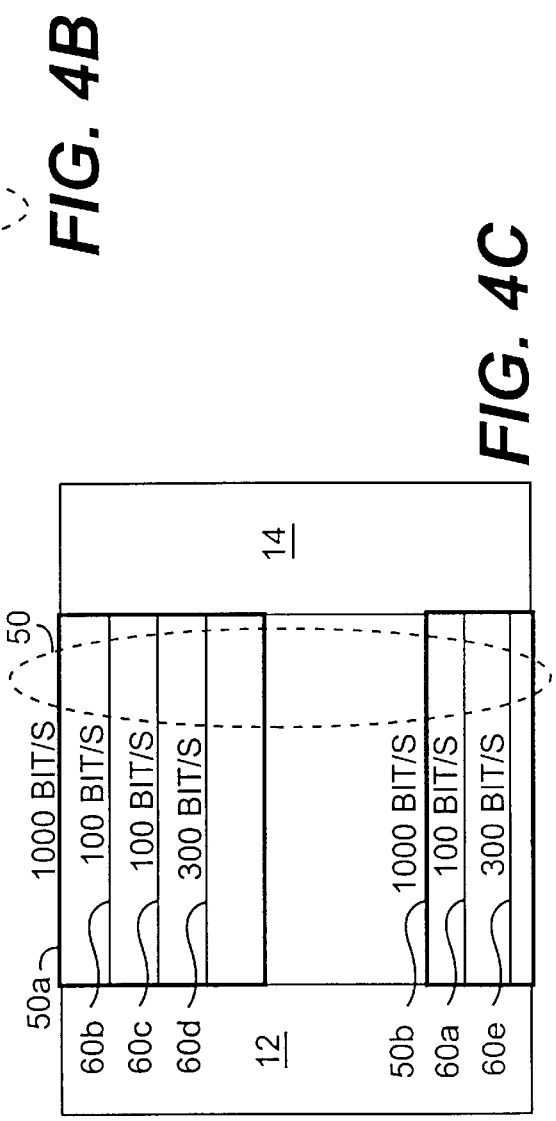

Transmission links of a transmission link group may remain unbalanced after redistribution according to equations (2) and (3), in the sense that the differences in bandwidth utilization among the transmission links may remain the same. However, subsequent improvement of the imbalance in bandwidth utilization is facilitated by reducing the difference in average bandwidth per active path of the transmission links spanning two nodes. FIGS. 4A–C illustrate this aspect of the invention. In FIG. 4A, transmission link group 50 contains two transmission links, 50a and 50b. By way of example only, active paths 60a,b,c on link 50a each have a bandwidth of 100 bits/second, for a total of 300 bits/second and utilization of 30%, whereas active paths 60d and 60e on link 50b each have a bandwidth of 300 bits/second, for a total of 600 bits/second and utilization of 60%. While the difference in bandwidth utilization, 30%, in this example cannot be reduced by moving an active path from one transmission link to another because that difference could only increase, the difference in average bandwidth can be reduced. The average bandwidth of transmission link 50a is 100 bits/second, while the average bandwidth of transmission link 50b is 300 bits/second, a difference of 200 bits/second.

FIG. 4B depicts the status of group 50 after transfer of path 60d from link 50b to link 50a. While the difference in bandwidth utilization remains 30%, the average bandwidths of transmission links 50a and 50b, respectively, are 150 bits/second and 300 bits/second, a difference of only 150 bits/second. Then, in a subsequent redistribution consistent with the present invention, active path 60a, for example, may be moved to transmission link 50b, resulting in a reduction in the difference between bandwidth utilizations of transmission links 50a and 50b (see FIG. 4c). Thus, the aspect of the invention represented by equations (2) and (3) and illustrated by FIGS. 4A–C serves to assist in the goal of reducing the difference in bandwidth utilization among transmission links.

Consistent with the present invention, each switching node determines whether to move an active path from its present transmission link to a different transmission link in the same transmission link group to balance active path resources in the manner described above. FIG. 5A illustrates trunk path administrators 70a–c on switching node 12, and trunk path administrators 72a,b,c on switching node 14. Trunk path administrators are responsible for managing trunk resources at each end of a trunk. For purposes of resource balancing trunk path administrators send gather packets, such as gather packet 80, through the current route to gather information about the current path and to store information identifying candidate links and preferred links along the route.

For example, with reference to FIG. 1, for a route between source switching node 12 and destination switching node 18, a trunk path administrator on switching node 18 transmits a gather packet over the active path on a transmission link in link group 34 to switching node 16. Switching node 16 in turn transmits the gather packet over the active path on a transmission link in link group 32 to switching node 14, which then transmits the gather packet over the active path on a transmission link in link group 30. As will be discussed in more detail below, each switching node along the route inserts information identifying candidate links (and preferred links when appropriate) into the gather packet.

In FIG. 5A, trunk path administrator 70c manages link 30c for switching node 12, and trunk path administrator 72c manages link 30c for switching node 14. Trunk path administrator 72c determines whether transmission links 30a and 30b are candidates for redistribution of path 40c. Trunk path administrator 72c then sends gather packet 80, which contains identifiers for candidate links, along path 40c to trunk path administrator 70c. FIG. 5B illustrates a portion of the contents of gather packet 80. Trunk path administrator 72c has inserted identifiers for links 30a and 30b into the portion of gather packet 80 containing candidates for redistribution within transmission link group 30.

Figure 6:
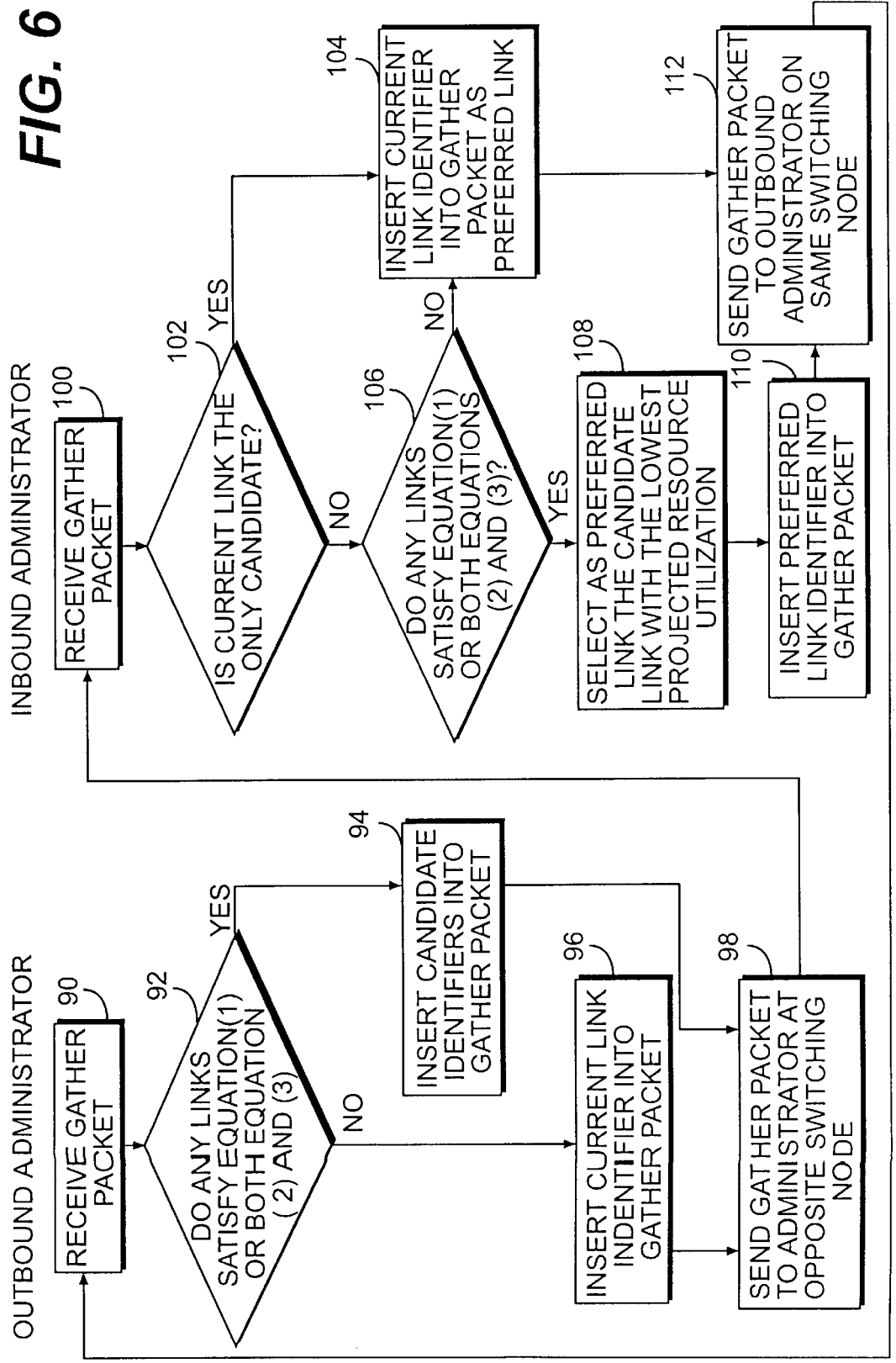
FIG. 6 illustrates a flowchart detailing steps for verifying candidate status of a link consistent with the present invention.

FIG. 6 is a flowchart detailing steps for verifying candidate status consistent with the present invention. Trunk path administrators at each switching node typically have knowledge about network resources in only one direction. For example, with reference to FIG. 5A, trunk path administrators 72a–c on switching node 14 have knowledge about resources on links 30a–c in the outbound direction from switching node 14 looking toward switching node 12. Similarly, trunk path administrators 70a–c on switching node 12 have knowledge about resources on links 30a–c in the inbound direction from switching node 12 looking toward switching node 14. Thus, the status of a transmission link identified by trunk path administrator 72c as a candidate in the outbound direction must be verified by trunk path administrator 70c in the inbound direction at switching node 12 (i.e., at the opposite end of the transmission link 30c).

If switching node 14 is the destination, then node 14 creates gather packet 80 and delivers it to trunk path administrator 72c. If switching node 14 is not the destination, then trunk path administrator 72c receives gather packet 80 from another trunk path administrator on switching node 14, which received gather packet 80 from another switching node. When trunk path administrator 72c receives gather packet 80 (step 90), it determines whether there are any candidate transmission links within transmission link group 30 that satisfy equation (1) or both equations (2) and (3) for active path 40c (step 92). If there are, trunk path administrator 72c inserts identifiers for the candidate transmission links, e.g., 30a and 30b, into gather packet 80 (step 94). If there are no candidate transmission links satisfying equation (1) or equations (2) and (3), then the identifier for transmission link 30c currently carrying active path 40c is inserted into gather packet 80 (step 96). Trunk path administrator 72c then sends gather packet 80 across link 30c to trunk path administrator 70c (step 98).

When inbound trunk path administrator 70c receives gather packet 80 (step 100), and if the only candidate transmission link for active path 40c is current link 30c (step 102), then trunk path administrator 70c records the identifier for that candidate transmission link (the current link) in gather packet 80 as the preferred link (step 104). Otherwise, trunk path administrator 70c determines whether any of the candidate links inserted by trunk path administrator 72c satisfies equation (1) or both equations (2) and (3) (step 106). If none do, then trunk path administrator 70c records the identifier for current link 30c in gather packet 80 as the preferred link (step 104). If equation (1) or both equations (2) and (3) are satisfied, trunk path administrator 70c selects as nz the preferred link the candidate link with the lowest projected resource usage (step 108) and inserts its identifier into gather packet 80 (step 110) as the preferred link. The preferred link identifier specifies the segment of the preferred route for the hop between nodes 12 and 14. If switching node 12 is the source, then trunk path administrator 70c passes the gather packet to the source of the connection. If switching node 12 is not the source, then trunk path administrator 70c delivers gather packet 80 to another trunk path administrator on switching node 12 (step 112) and the process repeats for another hop on the route until the source of the connection receives the gather packet containing the entire specification of the preferred route from source to destination.

It will be appreciated by those skilled in the art that various modifications and variations can be made to the path balancing consistent with the present invention without departing from the scope or the spirit of the invention. Other embodiments of the invention will be apparent to those skilled in the art from consideration of the specification and practice of the methodology disclosed herein. The specification and examples are only exemplary, with the true scope and spirit of the invention being indicated by the following claims.

We claim:

1. In a connection-oriented packet switching network including a plurality of switching nodes interconnected by a plurality of link groups, each link group including a plurality of links for carrying traffic paths, a method for distributing the traffic paths among the links of a group comprising the steps of:

measuring utilization of a network resource by a first one of the links of a group currently carrying a traffic path and by a second one of the links of the group;

comparing the measures of the utilizations of the network resource by the first one of the links and the second one of the links;

identifying one of the first or second links as a candidate for carrying the traffic path based on the comparison;

moving the traffic path to a candidate link such that the move reduces variation in the utilization of the network resource by each of the links in the group.

2. The method of claim 1 wherein the step of comparing includes the substeps of determining a first difference between a current network resource utilization by the first link and a current network resource utilization by the second link; and determining a second difference between a projected network resource utilization by the first link and a projected network resource utilization by the second link.

3. The method of claim 2 wherein the step of comparing further includes the substeps of comparing the first and second differences; and identifying one of the links as a candidate if the difference between the current network resource utilizations for the links exceeds the difference between the projected network resource utilizations for the links.

4. The method of claim 3 wherein the substep of determining the second difference in the projected network resource utilization by each link includes the substep of determining what the resource utilization by each link would be after a proposed redistribution of network traffic.

5. The method of claim 4 wherein the step of comparing a measure of the utilization of a network resource includes the substep of comparing at least one of bandwidths, CPU, or memory.

6. The method of claim 1 wherein the step of comparing includes the step of comparing a measure of an average utilization of a network resource by the first one of the links with a measure of an average utilization of the network resource by the second one of the links.

7. In a connection-oriented packet switching network including a plurality of switching nodes interconnected by a plurality of link groups each including a plurality of links for carrying traffic paths, a method for distributing the traffic paths among the links comprising the steps of:

measuring utilization of a network resource by a first one of the links of a group currently carrying a traffic path and by a second one of the links of the group;

comparing the measures of the utilizations of the network resource by the first one of the links and the second one of the links, including determining a first difference between a current network resource utilization by the first link and a current network resource utilization by the second link and determining a second difference between a projected network resource utilization by the first link and a projected network resource utilization by the second link;

determining whether the difference between the current network resource utilizations for the links exceeds the difference between the projected network resource utilizations for the links;

comparing a measure of an average utilization of a network resource by a first link of a group with a measure of an average utilization of the network resource by a second link of the group if the difference of current utilizations does not exceed the difference in projected utilizations;

identifying candidate links for carrying the traffic path, links for which the difference between the current network resource utilizations exceeds the difference between the projected network resource utilizations; and moving the traffic path to one of the candidate links.

8. The method of claim 7 wherein the step of comparing the measures of the average utilizations includes the substeps of determining a difference between a current average network resource utilization by the first link and a current average network resource utilization by the second link; and determining a difference between a projected average network resource utilization by the first link and a projected average network resource utilization by the second link.

9. The method of claim 8 including the step of identifying a link as a candidate if both the difference between the current network resource utilizations for the links equals the difference between the projected network resource utilizations by the links and the difference between the current average network resource utilizations by the links exceeds the difference between the projected average network resource utilizations by the links.

10. The method of claim 1 further comprising the steps of:

comparing projected network resource utilizations of all candidates when a plurality of links are identified as candidates for carrying the traffic path; and identifying one of the candidates as a preferred link for carrying the traffic path based on the comparison of projected network resource utilizations.

11. The method of claim 6 further comprising the steps of:

comparing projected network resource utilizations of all candidates when a plurality of links are identified as candidates for carrying the traffic path; and identifying one of the candidates as a preferred link for carrying the traffic path based on the comparison of projected network resource utilizations.

12. The method of claim 2 wherein the substep of determining the difference in current network resource utilization by each link includes the substep of dividing a total current utilization of the resource by the link by a total potential utilization of the resource by the link, and wherein the substep of determining the difference in projected network resource utilization by each link includes the substep of dividing what the utilization of the resource by the link would be after a proposed redistribution of network traffic by the total potential utilization of the resource by the link.

13. The method of claim 7 wherein the substep of comparing a measure of average utilization of the network resource by each link includes the substep of dividing a total current utilization of the resource by the link by the number of traffic paths on the link.

14. The method of claim 1 further comprising the step of transmitting a gather packet to a switching node, the gather packet containing information identifying the candidate links.

15. The method of claim 10 further comprising the step of transmitting a gather packet to a switching node, the gather packet containing information identifying the preferred link.

16. In a connection-oriented packet switching network including a plurality of switching nodes interconnected by a plurality of link groups, each group including a plurality of links for carrying traffic paths, a method for distributing the traffic paths among the links comprising the steps of:

measuring utilization of a network resource by the link currently carrying the traffic path and by all other links in the group;

comparing the measures of the utilizations of the network resource by the link currently carrying a traffic path the other links in the group;

identifying one link as a candidate for carrying the traffic path based on the comparison; and moving the network traffic path from the link currently carrying the path to the link identified as the candidate link thereby reducing variation in the utilization of the network resource between the links in the group.

17. In a connection-oriented packet switching network including a plurality of switching nodes interconnected by a plurality of link groups, each including a plurality of links for carrying traffic paths, an apparatus for distributing the traffic paths among the links, comprising:

means for comparing measures of utilizations of a network resource by a first one of the links of a group currently carrying a traffic path and by a second one of the links of the group; and means for identifying one of the first or second links as a candidate for carrying the traffic path based on the comparison of the measures of the utilizations.

18. The apparatus of claim 17 wherein
the means for identifying includes means for identifying all candidate links for carrying the traffic path,
and wherein the apparatus comprises means for moving the traffic path to a candidate link.

19. The apparatus of claim 18 wherein the means for comparing includes means for determining a first difference between a current network resource utilization by the first link and a current network resource utilization by the second link; and means for determining a second difference between a projected network resource utilization by the first link and a projected network resource utilization by the second link.

20. The apparatus of claim 19 wherein the means for comparing further includes means for comparing the first and second differences; and means for identifying one of the links being identified as a candidate if the difference between the current network utilizations for the links exceeds the difference between the projected network resource utilizations for the links.

21. The apparatus of claim 20 wherein the means for determining a second difference in the projected network resource utilization by each link includes means for determining what the utilization by each link would be after a proposed redistribution of network traffic.

22. The apparatus of claim 21 wherein the means for comparing includes means for comparing at least one of bandwidths, CPU, or memory.

23. The apparatus of claim 18 wherein the means for comparing includes means for comparing a measure of an average utilization of a network resource by a first link of a group with a measure of an average utilization of the network resource by a second link of the group.

24. The apparatus of claim 20 wherein the means for comparing the differences includes means for determining whether the current network resource utilizations for the links exceeds the difference between the projected network resource utilizations for the links; and means for comparing a measure of an average utilization of a network resource by a first link of a group with a measure of an average utilization of the network resource by a second link of the group if the difference of current utilizations does not exceed the difference in projected utilizations.

25. The apparatus of claim 24 wherein the means for comparing the measures of the average utilizations includes means for determining a difference between a current average network resource utilization by the first link and a current average network resource utilization by the second link; and means for determining a difference between a projected average network resource utilization by the first link and a projected average network resource utilization by the second link.

26. The apparatus of claim 25 including means for identifying a link as a candidate if both the difference between the current network resource utilizations for the links equals the difference between the projected network resource utilizations by the links and the difference between the current average network resource utilizations by the links exceeds the difference between the projected average network resource utilizations by the links.

27. The apparatus of claim 18 further comprising:
means for comparing projected network resource utilizations of all candidates when a plurality of links are identified as candidates for carrying the traffic path; and
means for identifying one of the candidates as a preferred link for carrying the traffic path based on the comparison of projected network resource utilizations.

28. The apparatus of claim 23 further comprising:
means for comparing projected network resource utilizations of all candidates when a plurality of links are identified as candidates for carrying the traffic path; and
means for identifying one of the candidates as a preferred link for carrying the traffic path based on the comparison of projected network resource utilizations.

29. The apparatus of claim 19 wherein the means for determining the difference in current network resource utilization by each link includes means for dividing a total current utilization of the resource by the link by a total potential utilization of the resource by the link, and wherein the means for determining the difference in projected network resource utilization by each link includes means for dividing what the utilization of the resource by the link would be after a proposed redistribution of network traffic by the total potential utilization of the resource by the link.

30. The apparatus of claim 24 wherein the means for comparing a measure of average utilization of the network resource by each link includes means for dividing a total current utilization of the resource by the link by the number of traffic paths on the link.

31. The apparatus of claim 17 further comprising means for transmitting a gather packet to a switching node, the gather packet containing information identifying the candidate links.

32. The apparatus of claim 27 further comprising means for transmitting a gather packet to a switching node, the gather packet containing information identifying the preferred link.

33. In a connection-oriented packet switching network including a plurality of switching nodes interconnected by a plurality of link groups, each group including a plurality of links for carrying traffic paths, an apparatus for distributing the traffic paths among the links comprising:

means for comparing measures of utilizations of a network resource by the link currently carrying a traffic path and by all other links in the group;

means for identifying one link as a candidate for carrying the traffic path based on the comparison; and means for moving the network traffic path from the link currently carrying the path to the link identified as the candidate link thereby reducing variation in the utilization of the network resource between the links in the group.

34. A connection-oriented packet switching network comprising:

a plurality of link groups, each group including a plurality of links for carrying traffic paths; and a plurality of switching nodes interconnected by the link groups, each switching node including:

means for comparing measures of utilizations of a network resource by a first link of a group currently carrying a traffic path and by a second link of the group, and means for identifying one of the first or second links as a candidate for carrying the traffic path based on the comparison.

35. The network of claim 34 wherein the means for identifying includes means for identifying all candidate links for carrying the traffic path, the switching node further comprising means for moving the traffic path to a candidate link such that the move reduces variation in the utilization of the network resource by each of the links in the group.

36. The network of claim 34 wherein the means for comparing further includes means for determining a first difference between a current network resource utilization by the first link and a current network resource utilization by the second link; and means for determining a second difference between a projected network resource utilization by the first link and a projected network resource utilization by the second link.

37. The network of claim 36, each switching node further including means for comparing the first and second differences; and means for identifying one of the links as a candidate if the difference between the current network utilizations for the links exceeds the difference between the projected network resource utilizations for the links.

38. The network of claim 34 wherein the means for comparing further includes means for comparing a measure of an average utilization of a network resource by a first link of a group with a measure of the average utilization of the network resource by a second link of the group.

39. A connection-oriented packet switching network comprising:

a plurality of link groups, each group including a plurality of links for carrying traffic paths;

a plurality of switching nodes interconnected by the link groups, each switching node including:

means for comparing measures of utilizations of a network resource by the link currently carrying the traffic path and by all other links in the group, means for identifying one as a candidate for carrying the traffic path based on the comparison, and means for moving the network the traffic path from the link currently carrying the traffic path to the link identified as the candidate thereby reducing variation in the utilization of the network resource between the links in the group.

* * * * *

UNITED STATES PATENT AND TRADEMARK OFFICE
CERTIFICATE OF CORRECTION

PATENT NO. : 6,195,354 B1
DATED : February 27, 2001
INVENTOR(S) : SKALECKI et al.

It is certified that error appears in the above-identified patent and that said Letters Patent is hereby corrected as shown below:

IN THE CLAIMS:

In Claim 1, Col. 7, line 15, after "comparison;", insert --and--.

In Claim 7, Col. 7, line 51, after "link groups", insert a comma.

In Claim 16, Col. 9, line 10, after "traffic path", insert --and by--.

In Claim 39, Col. 12, line 28, before "traffic path", delete "the".

Signed and Sealed this

Fifth Day of June, 2001

Attest:

*Attesting Officer*

NICHOLAS P. GODICI
*Acting Director of the United States Patent and Trademark Office*